US011907413B2

(12) United States Patent
Kim (10) Patent No.: US 11,907,413 B2
(45) Date of Patent: Feb. 20, 2024

(54) PLAY KITCHEN SYSTEM USING SMART DEVICE BASED ON VIRTUAL AUGMENTED REALITY AND SHORT RANGE WIRELESS COMMUNICATION (71) Applicant: FTCUBIC CO., LTD., Seoul (KR)

(72) Inventor: Se Jung Kim, Seoul (KR)

(*) Notice: Subject to any disclaimer, the term of this patent is extended or adjusted under 35 U.S.C. 154(b) by 804 days.

(21) Appl. No.: 17/045,177

(22) PCT Filed: Apr. 2, 2019

(86) PCT No.: PCT/KR2019/003843
§ 371 (c)(1),
(2) Date: Oct. 4, 2020

(87) PCT Pub. No.: WO2019/194521
PCT Pub. Date: Oct. 10, 2019

(65) Prior Publication Data
US 2021/0187408 A1 Jun. 24, 2021

(30) Foreign Application Priority Data

Apr. 5, 2018 (KR) .................. 10-2018-0039983

(51) Int. Cl.
G06F 3/01 (2006.01)
G06T 7/50 (2017.01)
(Continued)

(52) U.S. Cl.
CPC ............ *G06F 3/011* (2013.01); *A63F 13/213* (2014.09); *A63H 33/3055* (2013.01);
(Continued)

(58) Field of Classification Search
CPC ... G06F 3/011; A63F 13/213; A63H 33/3055; A63H 2200/00
See application file for complete search history.

(56) References Cited

U.S. PATENT DOCUMENTS 4,333,258 A * 6/1982 McCaslin .......... A63H 33/3055
446/481
6,937,152 B2 * 8/2005 Small .................... A63H 33/26
340/568.1
(Continued)

FOREIGN PATENT DOCUMENTS

KR 10-2007-0043764 4/2007
KR 10-2013-0111492 10/2013
(Continued)

OTHER PUBLICATIONS

The Most Common Causes of Unreadable Barcodes. Automate.org. Online. Apr. 5, 2015. Accessed via the Internet. <URL: https://www.automate.org/tech-papers/the-most-common-causes-of-unreadable-barcodes> (Year: 2015).*

(Continued)

Primary Examiner — Justin L Myhr
Assistant Examiner — Carl V Larsen
(74) Attorney, Agent, or Firm — ANTONIO HA & U.S. PATENT, LLC (57) ABSTRACT An embodiment of the present invention comprises, a play kitchen toy body in which toy cooking tools form one set, a playhouse set, which is a set of toy tools to be used for cooking in a play kitchen by using the play kitchen toy body, a user terminal by which a user uses a play kitchen through the play kitchen toy body and the playhouse set, and in which a play kitchen assistant application is installed, the application extracting a unique toy number of the toy tools of the playhouse set so as to transmit same together with a play kitchen type to a play kitchen assistant server, and receiving, from the play kitchen assistant server, play kitchen assistant content matched to the unique toy number and outputting same, the play kitchen assistant server extracting play kitchen guide content matched to the play kitchen type and the unique toy number received from the (Continued)

user terminal so as to provide same to the user terminal, and a mirror coupled to a toy sink included in the play kitchen toy body, wherein the user terminal can photograph a play kitchen toy reflected through the mirror so as to extract a unique toy number of the play kitchen toy detected from a captured mirror image.

13 Claims, 9 Drawing Sheets

(51) Int. Cl.
| | |
|---|---|
| *H04W 4/80* | (2018.01) |
| *G06F 16/23* | (2019.01) |
| *A63H 33/30* | (2006.01) |
| *G06K 7/10* | (2006.01) |
| *G06K 7/14* | (2006.01) |
| *G06K 19/06* | (2006.01) |
| *G06K 19/077* | (2006.01) |
| *G06T 19/00* | (2011.01) |
| *G09B 19/00* | (2006.01) |
| *H04R 1/02* | (2006.01) |
| *G06V 10/40* | (2022.01) |
| *G06V 20/20* | (2022.01) |
| *A63F 13/213* | (2014.01) |

(52) U.S. Cl.
CPC ..... *G06F 16/2379* (2019.01); *G06K 7/10297* (2013.01); *G06K 7/1417* (2013.01); *G06K 19/06037* (2013.01); *G06K 19/07758* (2013.01); *G06T 7/50* (2017.01); *G06T 19/006* (2013.01); *G06V 10/40* (2022.01); *G06V 20/20* (2022.01); *G09B 19/003* (2013.01); *H04R 1/028* (2013.01); *H04W 4/80* (2018.02); *A63H 2200/00* (2013.01); *H04R 2499/11* (2013.01); *H04R 2499/15* (2013.01)

(56) References Cited

U.S. PATENT DOCUMENTS

| | | | | |
|---|---|---|---|---|
| 2002/0111117 | A1* | 8/2002 | Ho | A63H 30/04 |
| | | | | 446/456 |
| 2006/0098312 | A1* | 5/2006 | Borg | G02B 17/023 |
| | | | | 359/862 |
| 2013/0331979 | A1* | 12/2013 | Koenigsknecht | G07F 11/44 |
| | | | | 198/550.1 |
| 2014/0259378 | A1* | 9/2014 | Combs | A47K 1/02 |
| | | | | 4/643 |
| 2014/0333025 | A1* | 11/2014 | Amireh | A63F 1/02 |
| | | | | 273/293 |
| 2016/0184724 | A1* | 6/2016 | Butler | G06F 3/0346 |
| | | | | 446/484 |
| 2016/0310866 | A1* | 10/2016 | Snape | F16M 13/02 |
| 2017/0173489 | A1* | 6/2017 | Akavia | A63H 33/3055 |
| 2017/0197155 | A1* | 7/2017 | Su | A63H 33/42 |
| 2021/0291052 | A1* | 9/2021 | Yeung | A63F 13/428 |

FOREIGN PATENT DOCUMENTS

| | | |
|---|---|---|
| KR | 10-1463237 | 11/2014 |
| KR | 20-0483471 | 5/2017 |

OTHER PUBLICATIONS

English Specification of 10-1463237.
English Specification of 10-2007-0043764.
English Specification of 10-2013-0111492.
English Specification of 20-0483471.

* cited by examiner

| kind of kitchen play | kitchen play order guide content |
|---|---|
| egg frying | toy frying pan-> toy egg -> toy salt ->.... |
| cooking gimbap | toy gim-> toy rice -> toy vegetable->.... |

PLAY KITCHEN SYSTEM USING SMART DEVICE BASED ON VIRTUAL AUGMENTED REALITY AND SHORT RANGE WIRELESS COMMUNICATION

TECHNICAL FIELD

The present invention relates to a kitchen play system in which a smart phone application adopting virtual augmented reality and short-range communication technology and real kitchen play have been fused together.

BACKGROUND ART

In general, toys mainly used by children at home have been developed and released with a variety of types and purposes ranging from toys for simple amusement purposes to educational toys for cognitive ability or language education for various objects.

Playing house with these toys is a game that children enjoy by imitating housekeeping with toy bowls or tools. By playing house or such play, children may play roles as parents, teachers and students, and doctors, nurses, and patients.

For such play, natural objects, such as grass or soil or shells, or items that may easily be obtained nearby have been used for playing house, but in modern times, toy houses or other various toys made of plastics, wood, or aluminum, are in wide use.

Meanwhile, children are known to have excellent learning ability, and for this reason, awareness of language, recognition of objects, and prevention of accidents are learned and educated at home. To increase the efficiency of learning education, spontaneous learning education is needed due to the nature of children who are curious about objects. Children are learning real life through realistic playing house because they have excellent learning ability to imitate their parents' language and actions.

In particular, most of toy kitchen sets that children use are a mere miniature of household kitchen utensils to suit children, which perform no functions as reduced replicas or mockups and thus, children may easily be bored with.

Toys for kitchen play with a luminous body and sound effects added have recently been proposed, but they provide only a static effect and fail to keep children's interest for a long time.

Therefore, a need exists for a means for children to enjoy cooking learning and playing house on their own by fusing virtual augmented IT technologies such as virtual reality (VR) and augmented reality (AR), which are popular, with toys for kitchen play.

PRIOR TECHNICAL DOCUMENTS

Patent Documents

Korean Patent No. 10-1463237

DETAILED DESCRIPTION OF THE INVENTION

Technical Problem

The technical object of the present invention is to suggest a method for establishing a kitchen play system that allows infants or children themselves to perform cooking learning by using virtual augmented reality technology-applied smartphone applications along with real kitchen play and a playing house set and upgrade kit as a medium for fusing real kitchen play with the smartphone application and as a means for creating business model profits.

Technical Solution

According to an embodiment of the present invention, a kitchen play system using a smart device based on virtual reality and short-range wireless communication comprises a kitchen play toy main body forming a set of toy cooking tools, a playing house set of toy props used in kitchen play on the kitchen play toy main body, a user terminal used by a user of the kitchen play using the kitchen play toy main body and the playing house set, a kitchen play helper app installed on the user terminal, the kitchen play helper app extracting a toy unique number of a toy prop of the playing house set, transmitting the extracted toy unique number, along with a kind of the kitchen play, to a kitchen play helper server, receiving a kitchen play helper content matching the toy unique number from the kitchen play helper server, and outputting the kitchen play helper content, the kitchen play helper server extracting a kitchen play guide content matching the kind of the kitchen play and the toy unique number received from the user terminal and providing the extracted kitchen play guide content to the user terminal, and a mirror coupled to a toy sink included in the kitchen play toy main body, wherein the user terminal captures a kitchen play toy reflected by the mirror and extracts a toy unique number of the kitchen play toy detected from the captured mirror image.

The mirror may be hinged to the toy sink to allow an angle of the reflection to be adjusted towards a toy cutting board placed on the toy sink.

The kitchen play helper content may include one or more of a kitchen play order guide content to guide kitchen play which needs to be performed next in order when any one kitchen play toy is detected and a kitchen play phrase/retry content to phrase or instruct to retry the kitchen play according to a state of the kitchen play toy detected.

The kitchen play helper content may be output in any one or more of a still image, a video, a virtual reality graphic, an augmented reality graphic, or a guidance voice.

The kitchen play helper server may include a server communication unit communicating with the user terminal, a kitchen play helper content storage unit storing the kitchen play helper content matching the toy unique number and the kind of the kitchen play, and a kitchen play helper content providing unit extracting a kitchen play guide content matching the toy unique number and the kind of the kitchen play received from the user terminal and providing the extracted kitchen play guide content to the user terminal, wherein the kitchen play helper content storage unit may include a kitchen play order guide content storage DB storing, per toy unique number, a kitchen play order guide content which needs to be performed next in order according to the kind of the kitchen play and a kitchen play phrase/retry content storage DB storing, per toy unique number, the kitchen play phrase/retry content to phrase or instruct to retry the kitchen play according to the state of the kitchen play toy according to the kind of the kitchen play.

The kitchen play helper content storage unit may assign a combination of the kitchen play order guide content and the kitchen play phrase/retry content, different per toy unique number, according to the kind of the kitchen play.

The kitchen play toy main body may include a default toy main body including a default toy to allow a user to manually enjoy the kitchen play and an upgrade toy kit including an upgrade toy to allow the user to enjoy the kitchen play by device control, wherein the upgrade toy kit may include a short-range wireless communication module performing wireless communication with the user terminal via short-range wireless communication.

The upgrade toy may wirelessly transmit a user device control value resultant from control by the user, along with the toy unique number of the upgrade toy, to the user terminal. The user terminal may wirelessly transmit the user device control value and the toy unique number of the upgrade toy received from the upgrade toy to the kitchen play helper server.

The kitchen play helper content storage unit may include an upgrade toy kit default storage DB in which a device control default value is assigned to each toy unique number of upgrade toy depending on the kind of the kitchen play. The kitchen play helper content providing unit may compare the user device control value received from the user terminal with the device control default value stored in the upgrade toy kit default value storage DB and provides the kitchen play helper content.

The kitchen play helper content providing unit may compare the user device control value received from the user terminal with the toy unique number of the upgrade toy stored in the upgrade toy kit default value storage DB and, when the values differ from each other, notify the user terminal that device control has been done wrong.

The user terminal may include a terminal communication unit communicating with the kitchen play helper server, a terminal speaker outputting the kitchen play helper content as an audio, a terminal display unit displaying the kitchen play helper content, a toy unique number extracting unit extracting the toy unique number of the kitchen play toy used in the kitchen play performed via the kitchen play toy main body using any one of a toy shape feature point, a QR code attached to the toy, and an NFC tag attached to the toy, and a terminal controller to drive the kitchen play helper app transmitting the extracted toy unique number to the kitchen play helper server via the terminal communication unit, receiving the kitchen play helper content matching the toy unique number from the kitchen play helper server via the terminal communication unit, and outputting the kitchen play helper content.

Upon extracting the toy unique number using the toy shape feature point, the user terminal may include a camera recording the toy of the kitchen play performed via the kitchen play toy main body and a toy shape feature point database storing the toy unique number assigned per toy shape feature point. The toy unique number extracting unit may extract the toy shape feature point of the kitchen play toy used in the kitchen play from the kitchen play image recorded via the camera and extract the toy unique number assigned to the extracted toy shape feature point from the toy shape feature point database.

Upon extracting the toy unique number using the QR code, the user terminal may include a camera capturing a QR code attached to the toy of the kitchen play performed via the kitchen play toy main body and a QR code database storing the toy unique number assigned per QR identification information. The toy unique number extracting unit may read QR identification information of the QR code attached to the kitchen play toy captured via the camera and extract the toy unique number assigned to the read QR identification information from the QR code database.

Upon extracting the toy unique number using the NFC tag, the user terminal may include an NFC reader performing NFC communication with the NFC tag attached to the kitchen play toy and reading NFC identification information and an NFC tag database storing the toy unique number assigned per NFC identification information. The toy unique number extracting unit may extract the toy unique number assigned to the NFC identification information read via the NFC reader from the NFC tag database.

Advantageous Effects

According to embodiments of the present invention, infants and children run smart phone applications, but in reality, conduct cooking guidance learning in real kitchen play. Thus, it is possible to disperse the view focused only on smart phones into real objects. Further, rather than kitchen play on the smartphone application, real role play may be performed in reality, thus presenting both education and play distinct from the conventional kitchen play. According to embodiments of the present invention, the educational effect can be doubled by receiving information on each cooking prop, how to use kitchen utensils, and safety education through smartphone graphics in which virtual augmented reality is fused.

MODE FOR CARRYING OUT THE INVENTION

Advantages and features of the present invention, and methods for achieving the same may be understood through the embodiments to be described below taken in conjunction with the accompanying drawings. However, the present invention is not limited to the embodiments disclosed herein, and various changes may be made thereto. The embodiments disclosed herein are provided only to inform one of ordinary skilled in the art of the category of the present invention. The present invention is defined only by the appended claims. When determined to make the subject matter of the present invention unclear, the detailed description of the known art or functions may be omitted.

Figure 1:
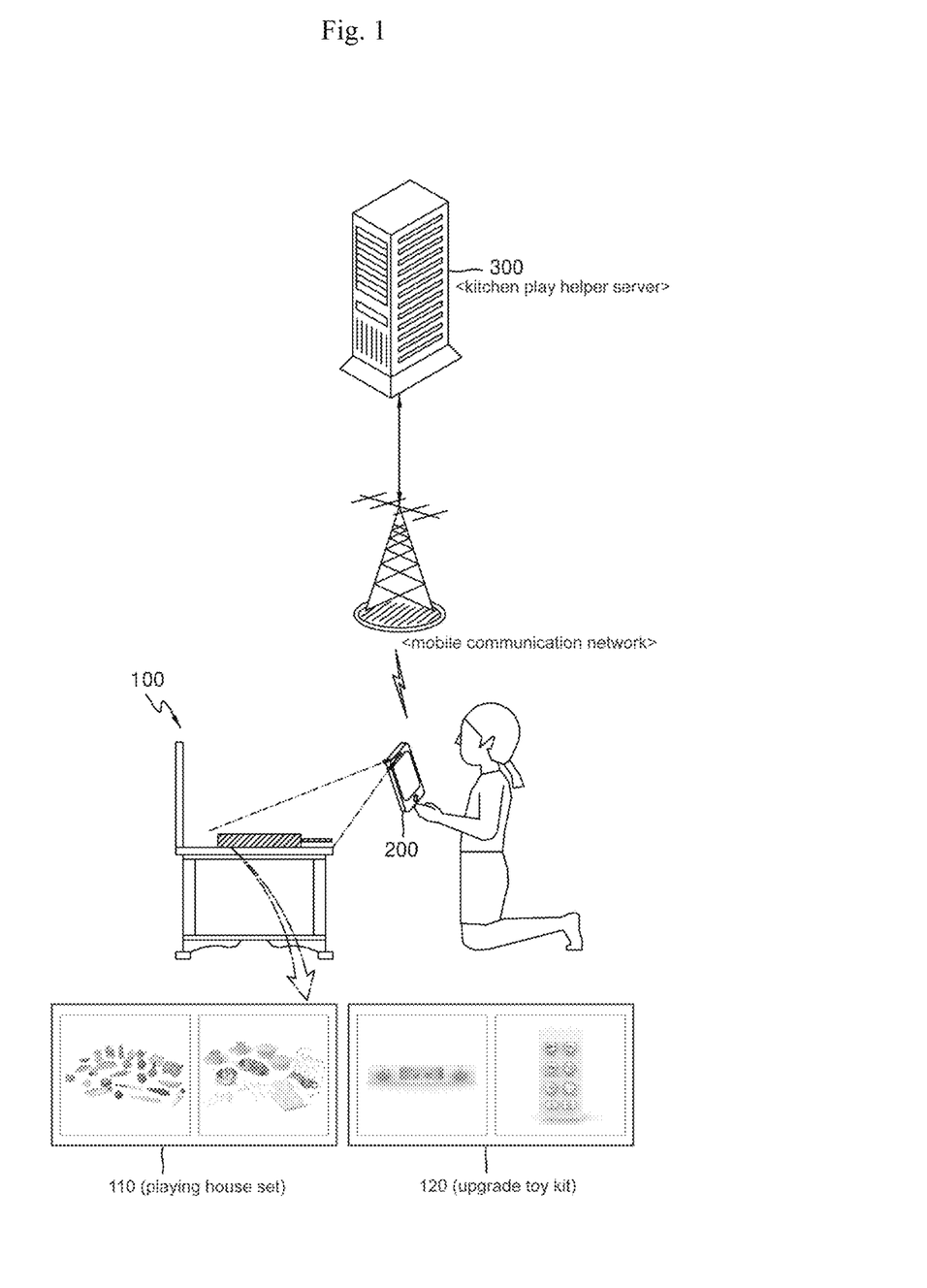
FIG. 1 is a view illustrating a configuration of a kitchen play system using a smart device based on virtual augmented reality and short-range wireless communication, according to an embodiment of the present invention.
Figure 2:
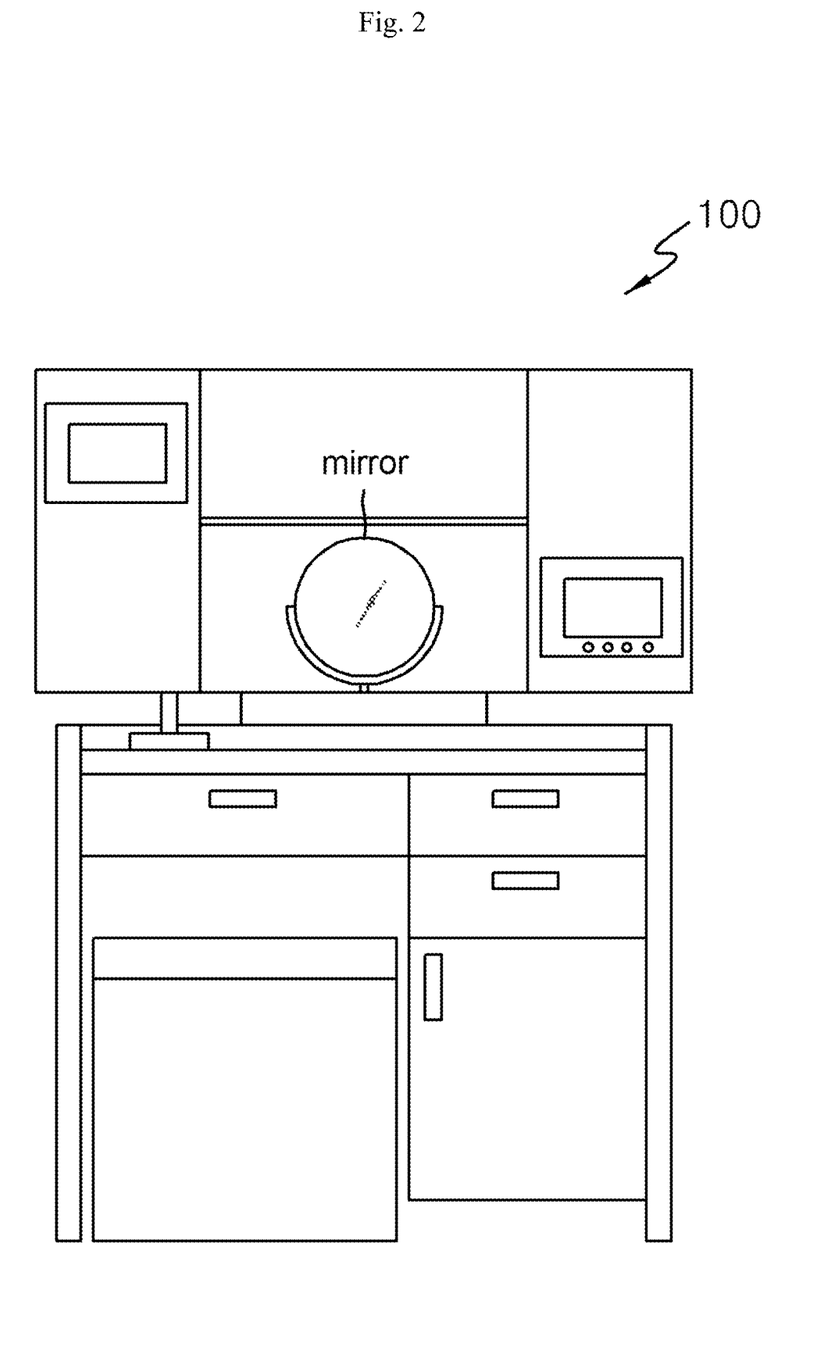
FIG. 2 is a view illustrating an example toy main body for kitchen play according to an embodiment of the present invention.
Figure 3:
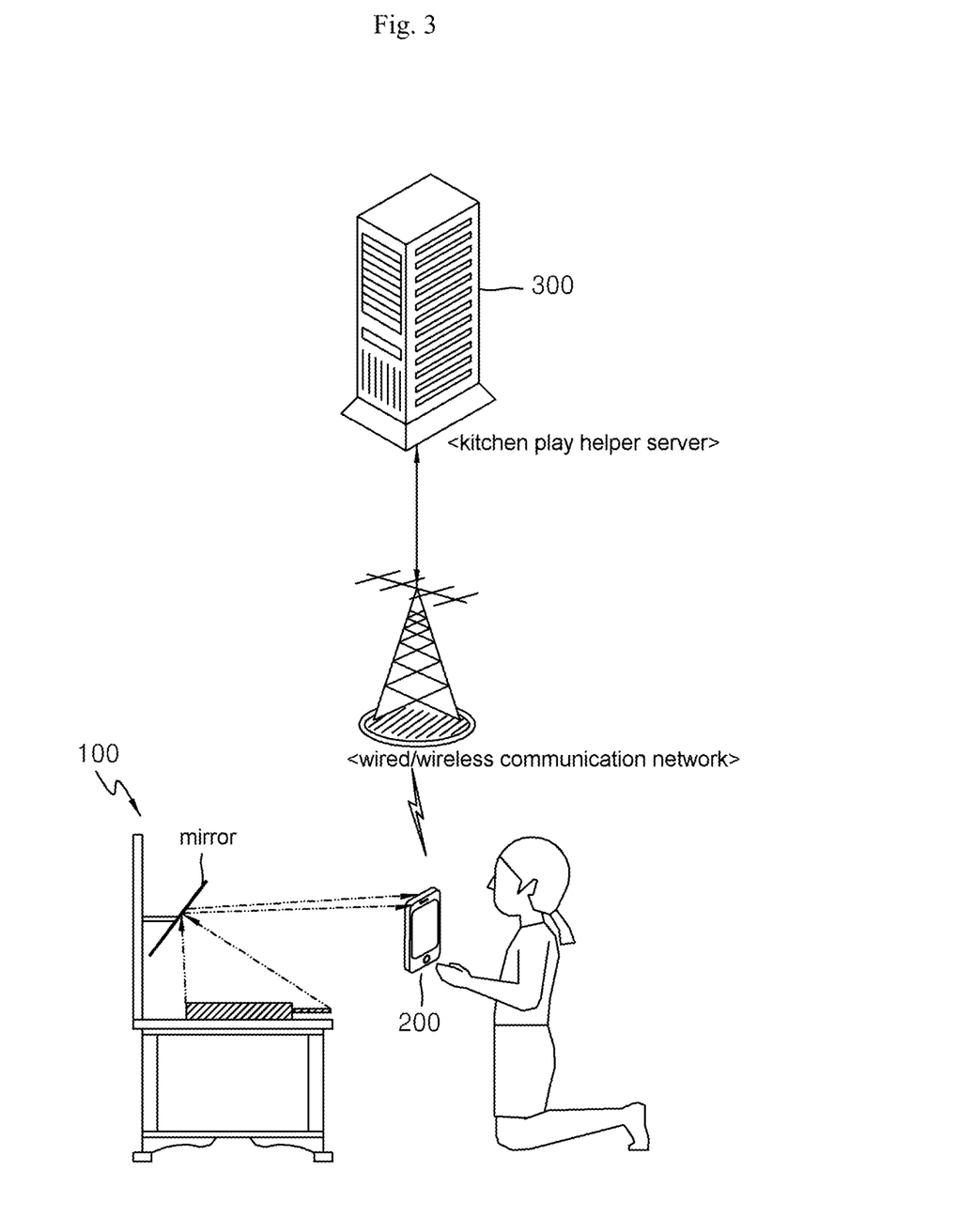
FIG. 3 is a view illustrating an example of guiding kitchen play, captured via a mirror, in virtual augmented reality-based kitchen play, according to an embodiment of the present invention.
Figure 4:
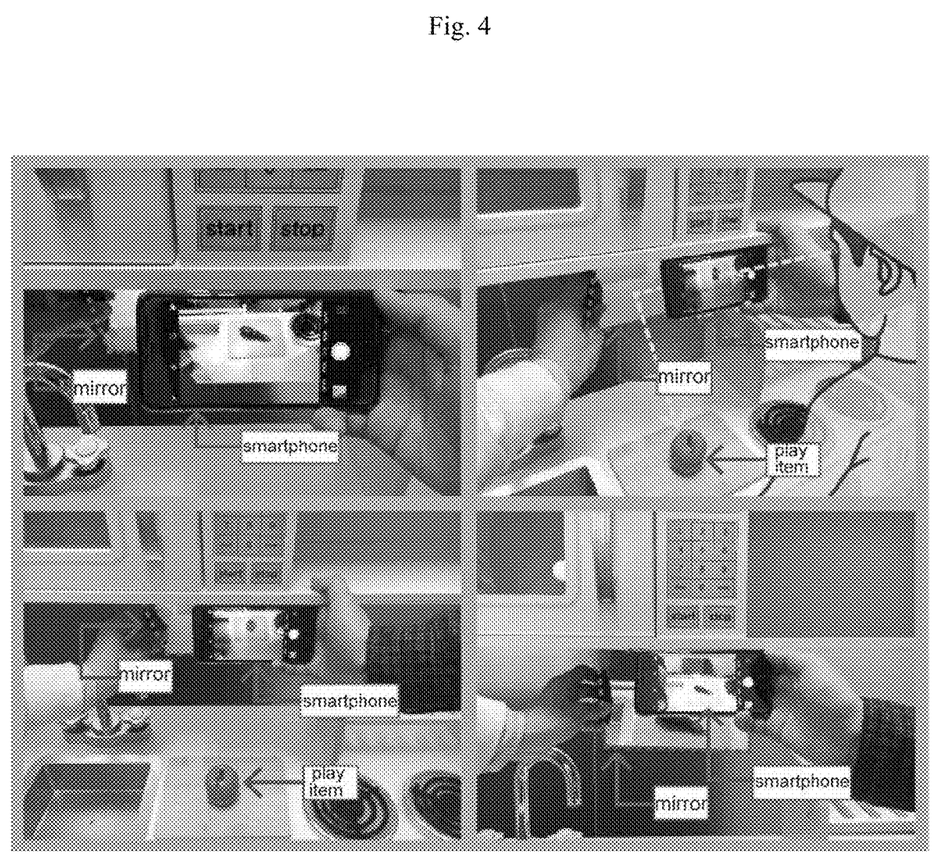
FIG. 4 illustrates photos of guiding kitchen play, captured via a mirror, in virtual augmented reality-based kitchen play, according to an embodiment of the present invention.
Figure 5:
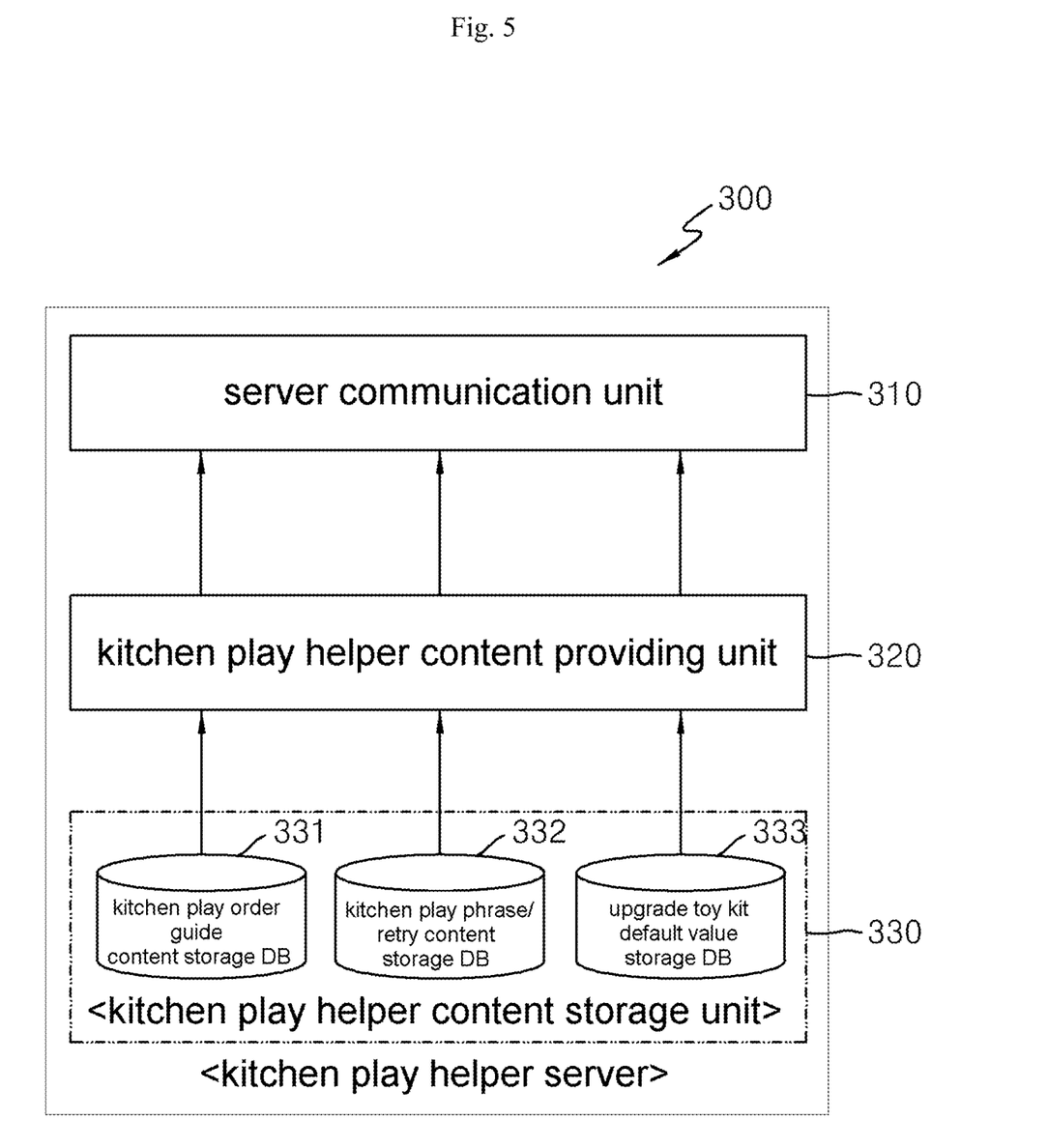
FIG. 5 is a block diagram illustrating a configuration of a kitchen play helper server according to an embodiment of the present invention.
Figure 6:
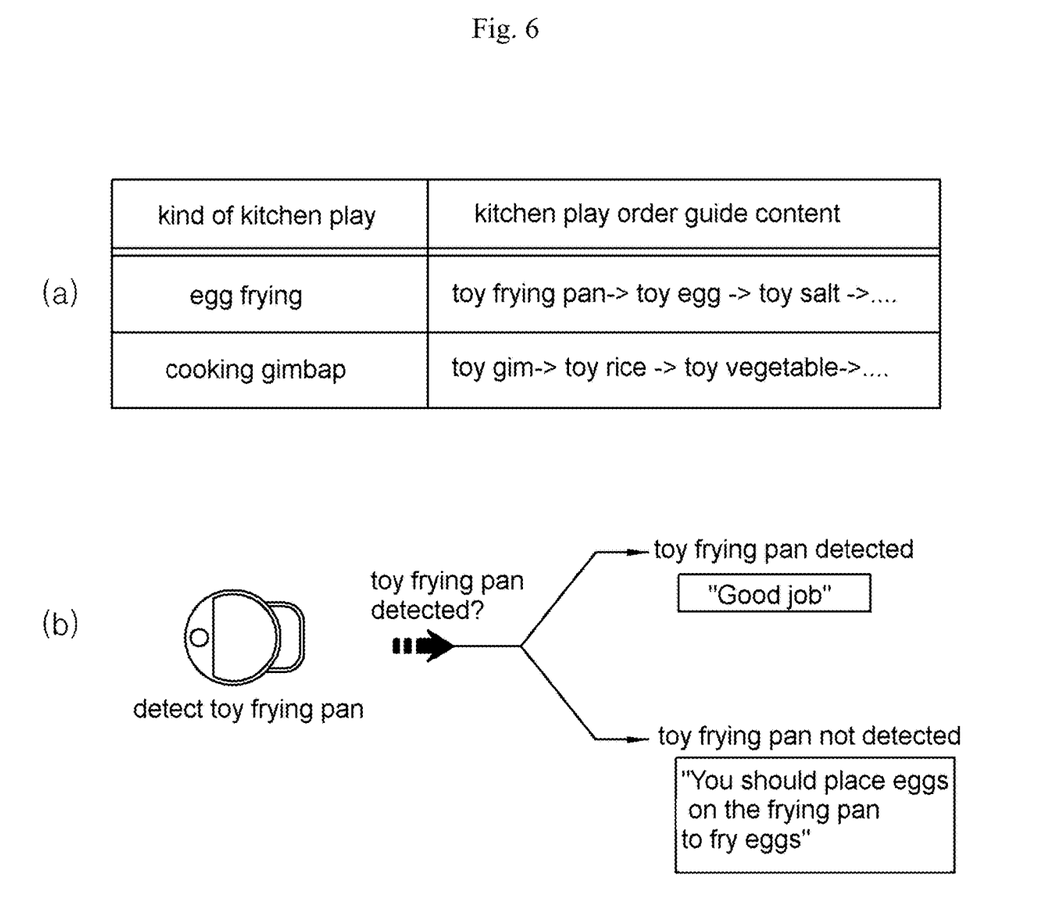
FIG. 6 is an example table in a kitchen play helper content storage unit according to an embodiment of the present invention.

FIG. 1 is a view illustrating a configuration of a kitchen play system using a smart device based on virtual augmented reality and short-range wireless communication, according to an embodiment of the present invention. FIG. 2 is a view illustrating an example toy main body for kitchen play according to an embodiment of the present invention. FIG. 3 is a view illustrating an example of guiding kitchen play, captured via a mirror, in virtual augmented reality-based kitchen play, according to an embodiment of the present invention. FIG. 4 illustrates photos of guiding kitchen play, captured via a mirror, in virtual augmented reality-based kitchen play, according to an embodiment of the present invention. FIG. 5 is a block diagram illustrating a configuration of a kitchen play helper server according to an embodiment of the present invention. FIG. 6 is an example table in a kitchen play helper content storage unit according to an embodiment of the present invention.

The present invention relates to guiding virtual reality-based kitchen play (cooking instruction). According to the present invention, when infants (2-4 years old) are doing play kitchen using kitchen play items on a kitchen play toy main body (made like a real kitchen, being about 1 m high, and including a toy sink, microwave, oven, or stove), a smartphone which has been installed recognizes the progress and checks whether the cooking is in progress well, and guides them to perform properly the parts that they are not doing good.

For example, if the smartphone is mounted on the kitchen play toy main body and records a toy cutting board, a cooking process step is determined for each dish, such as hamburger, pizza, salad, etc., If the infant places kitchen play props on the cooking board according to each step, and the smartphone instructs the infant via the screen and voice as to whether each step is properly performed. The screen may display a phrase when each step is properly done, but if not, a notification to request to retry.

To that end, the kitchen play system using a smart device based on virtual random access and short-range wireless communication, according to the present invention, may include a kitchen play toy main body 100, a playing house set 110, an upgrade toy kit 120, a user terminal 200, and a kitchen play helper server 300, as shown in FIG. 1.

The kitchen play toy main body 100 is a main item for enjoying the kitchen play and may include a set of toy cooking tools, including a toy sink, a toy refrigerator, a toy cutting board, a toy microwave oven, or a toy oven and may add a toy knife, a toy pot, a toy bowel, and a toy spoon/chopstick set/cooking set. The kitchen play toy main body 100 may further include a terminal mount to allow the user terminal 200 to face the toy sink of the kitchen play toy main body 100. The terminal mount may be rotated to vary the recording angle.

The kitchen play toy main body 100 may include a mirror coupled with the toy sink of the kitchen play toy main body as shown in FIG. 3. Since the user terminal 200 may fail to have a proper recording angle upon recording the top of the toy sink, a separate mirror may be coupled to the top of the toy sink so that the reflection, by the mirror, of the kitchen play being performed may be recorded by the user terminal 200 as shown in FIG. 4. The mirror may be hinged to the toy sink so that the reflection angle may be adjusted to face the toy cutting board placed on the toy sink. Thus, the user, e.g., an infant or child, may pivot the mirror to adjust the reflection angle of the mirror.

The playing house set 110 is a set of miniature vegetables, fruits, cheese, bread, eggs, meat, yogurt, or seasonings used for kitchen play on the kitchen play toy main body and may plays a role of a medium whose shape is captured or recorded by the camera of the user terminal 200 to determine whether the kitchen play is properly performed. The playing house set 110 provides a chance of creating profits by leading customers to extra purchases.

The upgrade toy kit 120 has a short-range communication device installed on the controller, such as of the toy microwave oven, toy oven, or toy stove and this also plays a role as a medium for determining whether the kitchen play is properly performed and provides a chance of creating profits by leading customers to extra purchases.

The playing house set 110 (e.g., toy vegetables, toy fruits, toy eggs, toy seasonings, etc.) and the upgrade toy kit 120 (e.g., the toy microwave oven controller, toy oven controller, toy ice maker controller, or toy stove controller) play a role as a medium for interconnecting the kitchen play toy main body 100 and a smart phone application installed on the user terminal 200.

The user terminal 200 is a terminal used by the user enjoying kitchen play on the kitchen play toy main body. Although an example of the user terminal 200 in the drawings is shown as a smartphone, the user terminal 200 is not limited to a smartphone but may be a tablet PC or a slate PC. Of course, the terminal to which the present invention is applicable is not limited to the above described ones but may rather include all mobile terminals which may communicate with external devices.

A kitchen play helper app is installed on the user terminal 200. The kitchen play helper app may extract the toy unique number of the kitchen play toy used in the kitchen play performed via the kitchen play toy main body 100, the playing house set 110, and the upgrade toy kit 120, transmit the extracted toy unique number, along with the kind of kitchen play selected by the user, to the kitchen play helper server 300, receive the kitchen play helper content matching the toy unique number from the kitchen play helper server 300, and output the received kitchen play helper content.

The toy unique number is an ID assigned to each toy. For example, as the unique IDs of OX001, OX002, OX003, and OX004 may be assigned to the toy cutting board, toy knife, toy egg, and toy tomato, respectively.

The kitchen play helper content may correspond to kitchen play order guide content to guide the order of kitchen play indicating, when any one kitchen play toy is detected, what kitchen play needs to be done next. For example, if the toy frying pan is detected after egg fry kitchen play is selected by the user, a guide content to instruct the toy egg, which is next in cooking order, on the toy frying pan may be displayed on the user terminal 200.

The kitchen play helper content may include one or more of kitchen play phrase/retry content depending on whether the detected kitchen play toy has properly performed the instruction of the kitchen play program, as well as the kitchen play order guide content. For example, in the case of egg fry kitchen play, if the toy frying pan is detected and then the toy egg, which is next in cooking order, is detected, kitchen play phrase/retry content, such as a phrase voice or phrase screen indicating that egg frying is properly in progress, may be displayed via the user terminal 200, and if a thing other than egg is detected, a content indicating that it is not an egg and instructing to get an egg may be included.

The kitchen play helper content may be output in any one or more of a still image (photo or picture), video, virtual reality graphic, augmented reality graphic, or guidance voice.

For reference, virtual reality (VR) refers to an interface between a user and a computer, which creates a certain environment or context as a virtual screen and allows the user to feel as if she interacts with a real-world environment or context. Augmented reality (AR) refers to technology in which virtual things are overlaid on the real-world image so that virtual contents are displayed on the real-world screen.

The user terminal 200 providing the kitchen play helper content is described below in detail with reference to FIG. 7.

The kitchen play helper server 300 may have substantially the same configuration as a typical web server in terms of hardware and may be implemented in various programming languages, such as C, C++, Java, Visual Basic, or Visual C in terms of software while including programming modules that have various functions.

The kitchen play helper server 300 extracts the kitchen play guide content matching the toy unique number and the kind of kitchen play received from the user terminal 200 and provides the extracted kitchen play guide content to the user terminal 200. The kitchen play helper server 300 and the user terminal 200 communicate with each other via a wired/wireless communication network. Where the wired/wireless communication network is implemented as a wireless communication network, data communication may be performed via a wireless mobile communication network including a base station (or base transceiver station (BTS)), a mobile switching center (MSC), and a home location register (HLR). Where the wired/wireless communication network is implemented as a wired communication network, data communication may be performed as per internet protocols, such as transmission control protocol/internet protocol (TCP/IP).

As shown in FIG. 5, the kitchen play helper server 300 may include a server communication unit 310, a kitchen play helper content storage unit 330, and a kitchen play helper content providing unit 320.

The server communication unit 310 supports protocols of hardware and software to communicate with the user terminal 200. The server communication unit 310 may perform data communication as per internet protocols, such as TCP/IP.

The kitchen play helper content storage unit 330 is storage for storing the kitchen play helper content matching the toy unique number and the kind of kitchen play. The storage may be provided inside the device, as a module capable of inputting or outputting information, such as a hard disk drive (HDD), a solid state drive (SSD), a flash memory, a compact flash (CF) card, a secure digital (SD) card, a smart media (SM) card, a multi-media card (MMC), or a memory Stick™, or the database may be provided in a separate device.

The kitchen play helper content storage unit 330 may include a kitchen play order guide content storage DB 331 and a kitchen play phrase/retry content storage DB 332.

The kitchen play order guide content storage DB 331 may store the kitchen play order guide content, which needs to proceed next in order depending on the kind of kitchen play, per toy unique number. For example, as shown in FIG. 6(a), in the case of egg fry kitchen play, the order of "toy frying pan->toy egg->toy salt" may be assigned and stored as the kitchen play order guide content and, in the case of Gimbap kitchen play, the order of "toy gim->toy rice->toy vegetable->toy gimbap roller" may be assigned and stored as the kitchen play order guide content.

The kitchen play phrase/retry content storage DB 332 stores the kitchen play phrase/retry content, which phrases the kitchen play according to the state of the kitchen play toy depending on the kind of kitchen play, per toy unique number. For example, as shown in FIG. 6(b), in the case of egg fry kitchen play, if the toy egg is detected as the toy frying pan is detected, the kitchen play phrase/retry content, such as a phrase saying that it's done well, may be assigned and, if the toy egg is not detected but other toy is detected after the toy frying pan is detected, an announcement or note instructing to retry with other toy as the cooking goes wrong is assigned.

Further, the kitchen play helper content storage unit 330 assigns a different combination of kitchen play order guide content and kitchen play phrase/retry content, per toy unique number depending on the kind of kitchen play. For example, in the case of egg fry kitchen play, a combination of "kitchen play order guide first content->kitchen play phrase first content->kitchen play phrase second content->kitchen play order guide second content-> . . . " may be assigned and stored depending on the toy unique number detected via the user terminal 200.

The kitchen play helper content providing unit 320 may extract the kitchen play guide content matching the toy unique number and the kind of kitchen play received from the user terminal 200 and provide the extracted kitchen play guide content to the user terminal 200 via the server communication unit 310. Thus, the user terminal 200 may display the kitchen play guide content matching the kitchen play toy detected during kitchen play, in a voice, still image, video, virtual reality graphic, or augmented reality graphic.

The upgrade toy kit 120 is a kit of one or more upgrade toys that allows the user to enjoy kitchen play by user device control. For example, the upgrade toys may include a toy microwave oven, a toy gas stove, a toy oven, or a toy ice maker.

The upgrade toy kit 120 includes a short-range wireless communication module that performs wireless communication with the user terminal 200 via short-range wireless communication. The short-range wireless communication may include wireless communication standards, such as infrared radiation, Bluetooth, radio frequency (RF), and wireless LAN.

Thus, the upgrade toy kit 120 may wirelessly transmit the control value of the user device controlled by the user, along with the toy unique number of the upgrade toy detected, to the user terminal 200, and the user terminal 200 may wirelessly transmit the toy unique number of the upgrade toy and the user device control value received from the upgrade toy kit 120, to the kitchen play helper server 300.

For example, in the case of a toy microwave oven, if the user, e.g., a kid, puts toy dumplings in the toy microwave oven and selects 'heat three minutes,' the toy microwave oven transmits an indicating that there is three-minute heating control, along with the microwave oven unique number of the toy microwave oven, to the user terminal 200 via short-range wireless communication, e.g., Bluetooth, and upon receiving the same, the user terminal 200 wirelessly transmits the indication that there is three-minute heating control, along with the microwave oven unique number, to the kitchen play helper server 300 via a mobile communication network.

The kitchen play helper content storage unit 330 of the kitchen play helper server 300 includes an upgrade toy kit default value storage DB 333 in which a device control default value is assigned to each toy unique number of upgrade toy depending on the kind of kitchen play.

The kitchen play helper content providing unit 320 compares the user device control device received from the user terminal 200 with the device control default value stored in the upgrade toy kit default value storage DB 333 and provides the kitchen play helper content. Thus, the kitchen play helper content providing unit 320 compares the user device control value received from the user terminal 200 with the device control default value assigned to the toy unique number of upgrade toy stored in the upgrade toy kit default value storage DB 333 and, if the values differ from each other, notify the user terminal 200 that the device control has been done wrong.

For example, in the case of kitchen play for cooking dumplings, if it is assumed that the need of operating the microwave oven 10 minutes (device control default value) after the toy dumpling is detected is assigned and stored in the upgrade toy kit default value storage DB 333, and an indicating that there is 3-minute heating control for the microwave oven after the toy dumpling is detected is received from the user terminal 200, the kitchen play helper content providing unit 320 notifies the user terminal 200 that the control of the microwave oven has been done wrong because the received three-minute heating controls is seven minutes different from the device control default value of 10 minutes.

Thus, the user, e.g., an infant or child, may be informed whether the user properly controls the toy microwave oven or toy gas stove upon kitchen play.

Figure 7:
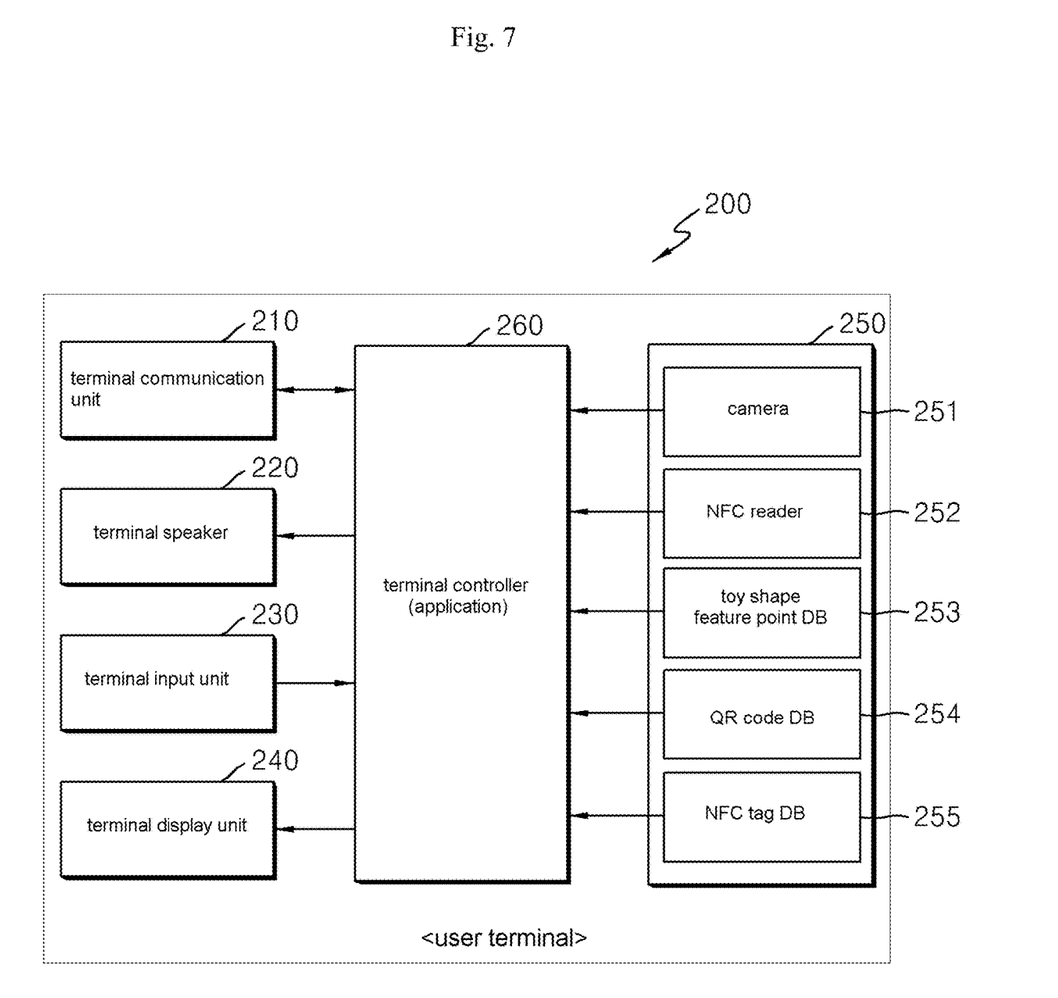
FIG. 7 is a block diagram illustrating a configuration of a user terminal according to an embodiment of the present invention.
Figure 8:
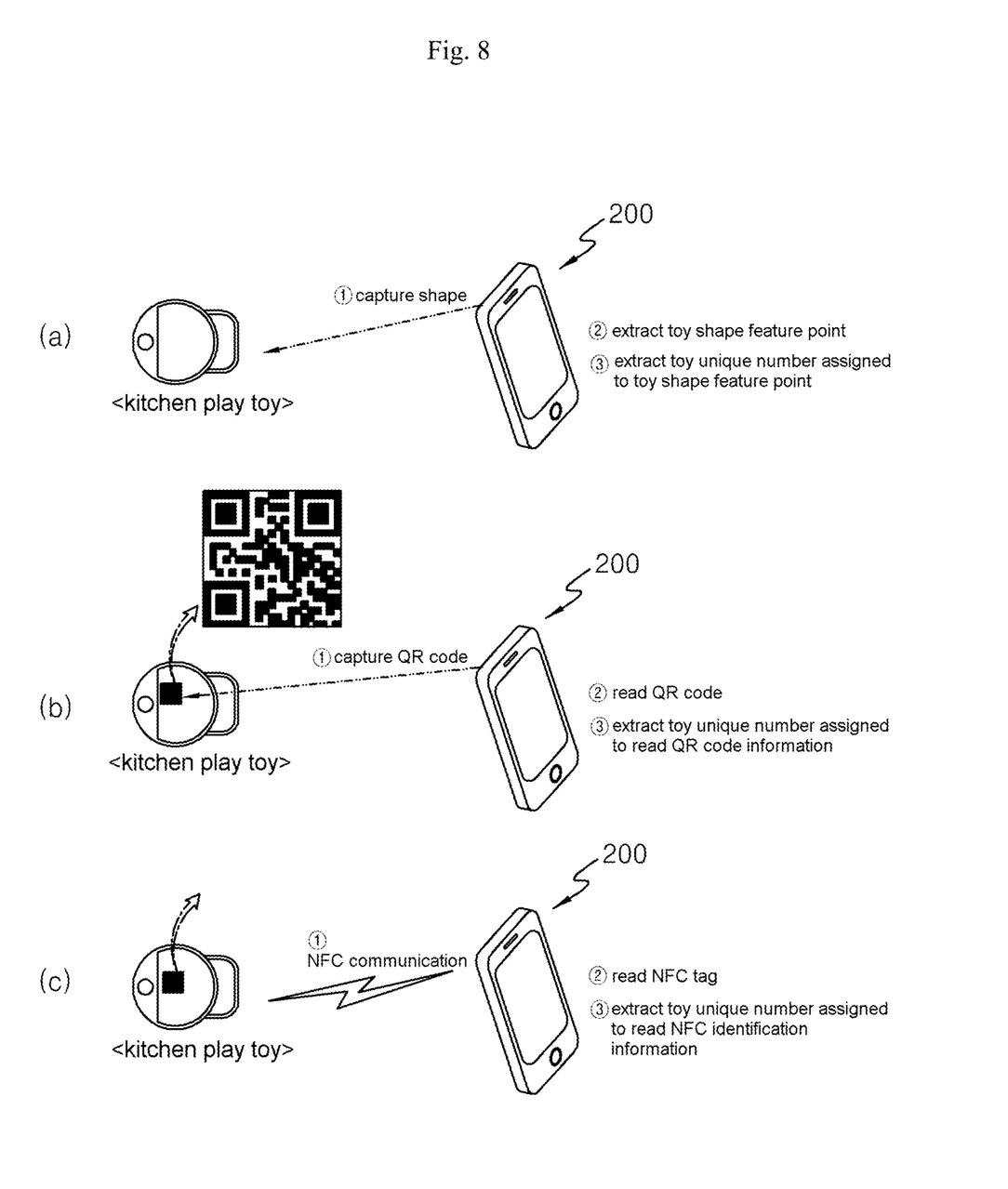
FIG. 8 is a view illustrating an example of extracting a toy unique number of a kitchen play toy according to an embodiment of the present invention.
Figure 9:
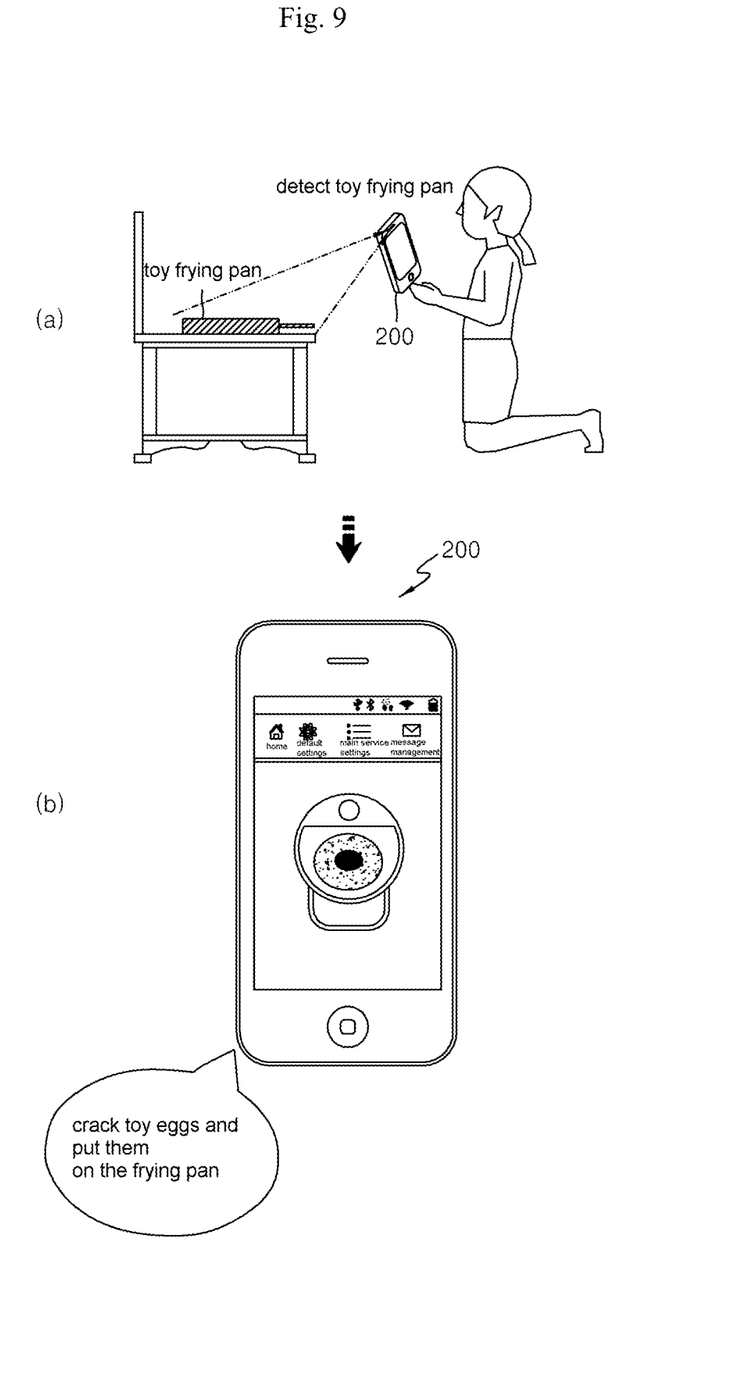
FIG. 9 is a view illustrating an example in which kitchen play helper content is output on a user terminal according to an embodiment of the present invention.

FIG. 7 is a block diagram illustrating a configuration of a user terminal according to an embodiment of the present invention. FIG. 8 is a view illustrating an example of extracting a toy unique number of a kitchen play toy according to an embodiment of the present invention. FIG. 9 is a view illustrating an example in which kitchen play helper content is output on a user terminal according to an embodiment of the present invention.

The user terminal 200 extracts the toy unique number of the kitchen play toy used in the kitchen play performed via the kitchen play toy main body and transmits the extracted toy unique number, along with the kind of kitchen play, to the kitchen play helper server 300, receives the kitchen play helper content matching the toy unique number from the kitchen play helper server 300, and outputs the received kitchen play helper content.

To that end, the user terminal 200 may include a terminal communication unit 210, a terminal speaker 220, a terminal input unit 230, a terminal display unit 240, a toy unique number extracting unit 250, and a kitchen play helper app-installed terminal controller 260 as shown in FIG. 7.

The terminal communication unit 210 is a module to communicate with the kitchen play helper server 300 by performing a function of communication via a mobile communication network. Upon performing mobile communication such as 3G or 3G, the terminal communication unit 210 includes an RF transmitter (not shown) to up-convert the frequency of signals wirelessly transmitted and amplify the signals and an RF receiver (not shown) to low-noise amplify received wireless signals and down-convert the frequency of the signals.

The terminal speaker 220 is a module to output the kitchen play helper content in the form of an audio.

The terminal input unit 230 is a module to receive necessary control values from the user.

The terminal display unit 240 is a module to display the kitchen play helper content. The terminal input unit 230 and the terminal display unit 240 may be implemented as a single for of touchscreen panel. The touchscreen panel provides a touchscreen capable of both input and display, is provided on the front surface of the terminal to display task screens and displays graphic user interfaces (GUIs) for communication with the user.

The toy unique number extracting unit 250 is a module to extract the toy unique number of the kitchen play toy used in the kitchen play performed via the kitchen play toy main body. The toy unique number may be extracted using any one of the feature point of the toy shape, QR code attached to the toy, or NFC tag attached to the toy.

First, an example of extracting the toy unique number using the feature point of the toy shape is described. The user terminal 200 may include a camera 251 to record the toy of the kitchen play performed via the kitchen play toy main body and a toy shape feature point database 253 that stores the toy unique number assigned per toy shape feature point. Here, the toy shape feature point may be a shape feature point of, e.g., the outer shape of the kitchen play toy.

Thus, as shown in FIG. 8(*a*), the toy unique number extracting unit 250 may extract the toy shape feature point of the kitchen play toy used in the kitchen play from the image of kitchen play recorded via the camera 251 and extract the toy unique number assigned to the extracted toy shape feature point from the toy shape feature point database 253. In other words, the shape of the toy recorded by applying various known shape extraction algorithms to the toy image recorded via the camera 251 may be extracted, and the toy unique number having the shape matching the extracted toy shape is extracted from the toy shape feature point database 253.

In the case where the kitchen play toy main body has a mirror, the user terminal 200 may record the kitchen play toy reflected by the mirror and extract the toy unique number from the recorded mirror image.

Second, an example of extracting the toy unique number using the QR code attached to the toy is described. The user terminal 200 may include a camera 251 to record the QR code attached to the toy of the kitchen play performed via the kitchen play toy main body and a QR code database 254 that stores the toy unique number assigned per QR identification information.

As known, the QR code is to differentiate between 0 and 1 depending on the grid pattern of the data area is bright or dark. As the grid of the grid pattern gets denser, more data may be entered. The grid cells in the grid pattern may be varied depending on the amount of information entered. Version 1 (a grid of 21 horizontally×21 vertically) to version 40 (177×177) are presently available. The highest version, i.e., version 40, may be converted into 23,648 bits of data. This amount may contain 7,089 numbers, 4,296 English letters, or 2,953 binary numbers. Thus, QR identification information may be assigned according to the grid pattern of the printed QR code.

Thus, as shown in FIG. 8(*b*), the toy unique number extracting unit 250 may read the QR identification information of the QR code attached to the kitchen play toy captured via the camera 251 and extract the toy unique number assigned to the read QR identification information from the QR code database 254.

Third, an example of extracting the toy unique number using the toy-attached NFC tag is described. The user terminal 200 includes an NFC reader 252 that performs NFC communication with the NFC tag attached to the kitchen play toy and reads NFC identification information and an NFC tag database 255 that stores the toy unique number assigned per NFC identification information. As known, near field communication (NFC) is standard-based short-range (a few centimeters) radio access technology that enables simple and safe two-way interaction between electronic devices.

Thus, the toy unique number extracting unit 250 may extract the toy unique number assigned to the NFC identification information read via the NFC reader 252 from the NFC tag database 255, as shown in FIG. 8(*c*).

Meanwhile, the terminal controller 260 is a module that is implemented as a main control unit (MCU) for controlling each functional module of the user terminal 200 and is a module on which the kitchen play helper app according to the present invention is driven. The user terminal 200 which is implemented as a smartphone may allow a few hundreds of types, various applications installed thereon, added thereto, or deleted therefrom as the user desires. The user by herself may produce her desired applications and may thus implement interfaces suited for herself through various applications. Thus, the kitchen play helper app may be downloaded from Google Market or Apple Store and be installed on the smartphone.

The kitchen play helper app driven by the terminal controller 260 transmits the extracted toy unique number to the kitchen play helper server 300 via the terminal communication unit 210, receives the kitchen play helper content matching the toy unique number from the kitchen play helper server 300 via the terminal communication unit 210, and outputs the kitchen play helper content.

For example, in the case of egg fry kitchen play, if the toy frying pan is detected using the user terminal 200 as shown in FIG. 9(*a*), a virtual reality (VR) graphic or augmented reality (AR) graphic in which the toy egg is cracked and positioned is displayed, as the kitchen play helper content, on the screen of the user terminal 200, as shown in FIG. 9(*b*). Further, a kitchen play helper content to instruct to place the toy egg on the toy frying pan may be output in voice.

While the present invention has been shown and described with reference to exemplary embodiments thereof, it will be apparent to those of ordinary skill in the art that various changes in form and detail may be made thereto without departing from the spirit and scope of the present invention as defined by the following claims.

The invention claimed is:

1. A kitchen play system using a smart device based on virtual reality and short-range wireless communication, the kitchen play system comprising:
   a kitchen play toy main body forming a set of toy cooking tools;
   a playing house set of toy props used in kitchen play on the kitchen play toy main body;
   a user terminal used by a user of the kitchen play using the kitchen play toy main body and the playing house set, a kitchen play helper app installed on the user terminal, the kitchen play helper app extracting a toy unique number of a toy prop of the playing house set, transmitting the extracted toy unique number, along with a kind of the kitchen play, to a kitchen play helper server, receiving a kitchen play helper content matching the toy unique number from the kitchen play helper server, and outputting the kitchen play helper content;
   the kitchen play helper server extracting a kitchen play guide content matching the kind of the kitchen play and the toy unique number received from the user terminal and providing the extracted kitchen play guide content to the user terminal; and
   a mirror coupled to a toy sink included in the kitchen play toy main body, wherein the user terminal captures a kitchen play toy reflected by the mirror and extracts a toy unique number of the kitchen play toy detected from the captured mirror image, wherein the kitchen play helper server includes:
   a server communication unit communicating with the user terminal;
   a kitchen play helper content storage unit storing the kitchen play helper content matching the toy unique number and the kind of the kitchen play; and
   a kitchen play helper content providing unit extracting a kitchen play guide content matching the toy unique number and the kind of the kitchen play received from the user terminal and providing the extracted kitchen play guide content to the user terminal, wherein the kitchen play helper content storage unit includes:
   a kitchen play order guide content storage DB storing, per toy unique number, a kitchen play order guide content which needs to be performed next in order according to the kind of the kitchen play; and
   a kitchen play phrase/retry content storage DB storing, per toy unique number, the kitchen play phrase/retry content to phrase or instruct to retry the kitchen play according to the state of the kitchen play toy according to the kind of the kitchen play.

2. The kitchen play system of claim 1, wherein the mirror is hinged to the toy sink to allow an angle of the reflection to be adjusted towards a toy cutting board placed on the toy sink.

3. The kitchen play system of claim 1, wherein the kitchen play helper content includes one or more of:
   a kitchen play order guide content to guide kitchen play which needsto be performed next in order when any one kitchen play toy is detected; and
   a kitchen play phrase/retry content to phrase or instruct to retry the kitchen play according to a stat: of the kitchen play toy detected.

4. The kitchen play system of claim 1, wherein the kitchen play helper content includes any, one or more of a still image, a video, a virtual reality graphic, an augmented reality graphic, or a guidance voice.

5. The kitchen play system of claim 1, wherein the kitchen play helper content storage unit assigns a combination of the kitchen play order guide content and the kitchen play phraselretry content, different per toy unique number, according to the kind of the kitchen play.

6. The kitchen play system of claim 1, wherein the kitchen play toy main body includes:
   a default toy main body including a default toy to allow a user to manually enjoy the kitchen play; and
   an upgrade toy kit including an upgrade toy to allow the user to enjoy the kitchen play by device control, wherein the upgrade toy kit includes a short-range wireless communication module performing wireless communication with the user terminal via short-range wireless communication.

7. The kitchen play system of claim 6, wherein the upgrade toy wirelessly transmits a user device control value resultant from control by the user, along with the toy unique number of the upgrade toy, to the user terminal, and wherein the user terminal wirelessly transmits the user device control value and the toy unique number of the upgrade toy received from the upgrade toy to the kitchen play helper server.

8. The kitchen play system of claim 7, wherein the kitchen play helper content storage unit includes an upgrade toy kit default storage DB in which a device control default value is assigned to each toy unique number of upgrade toy depending on the kind of the kitchen play, and wherein the kitchen play helper content providing unit compares the user device control value received from the user terminal with the device control default value stored in the upgrade toy kit default value storage DB and provides the kitchen play helper content.

9. The kitchen play system of claim 8, wherein the kitchen play helper content providing unit compares the user device control value received from the user terminal with the toy unique numberof the upgrade toy stored in the upgrade toy kit default value storage DB and, when the values differ from each other, notifies the user terminal that device control has been done wrong.

10. The kitchen play system of claim 1, wherein the user terminal includes:
   a terminal communication unit communicating with the kitchen play helper server;
   a terminal speaker outputting the kitchen play helper content as an audio;
   a terminal display unit displaying the kitchen play helper content;
   a toy unique number extracting unit extracting the toy unique number of the kitchen play toy used in the kitchen play performed via the kitchen play toy main body using any one of a toy shape feature point, a QR code attached to the toy, and an NEC tag attached to the toy; and
   a terminal controller to drive the kitchen play helper app transmitting the extracted toy unique number to the kitchen play helper server via the terminal communication unit, receiving the kitchen play helper content matching the toy unique number from the kitchen play helper server via the terminal communication unit, and outputting the kitchen play helper content.

11. The kitchen play system of claim 10, wherein upon extracting the toy unique number using the toy shape feature point, the user terminal includes:
   a camera recording the toy of the kitchen play performed via the kitchen play toy main body; and
   a toy shape feature point database storing the toy unique number assigned per toy shape feature point, and wherein the toy unique number extracting unit extracts the toy shape feature point of the kitchen play toy used in the kitchen play from the kitchen play image recorded via the camera and extracts the toy unique number assigned to the extracted toy shape feature point from the toy shape feature point database.

12. The kitchen play system of claim 10, upon extracting the toy unique number using the QR code, the user terminal includes:
   a camera capturing a QR code attached to the toy of the kitchen play performed via the kitchen play toy main body; and
   a QR code database storing the toy unique number assigned per QR identification information, wherein the toy unique number extracting unit reads QR identification information of the QR code attached to the kitchen play toy captured via the camera and extracts the toy unique number assigned to the read QR identification information from the QR code database.

13. The kitchen play system of claim 10, wherein upon extracting the toy unique number using the NFC tag, the user terminal includes:
   an NFC reader performing NFC communication with the NFC tag attached to the kitchen play toy and reading NFC identification information; and
   an NFC tag database storing the toy unique number assigned per NFC identification information, and wherein the toy unique number extracting unit extracts the toy unique number assigned to the NFC identification information read via the NFC reader from the NFC tag database.

\* \* \* \* \*